3,369,251
MICROWAVE TRANSDUCER
Harold C. Anderson, Rockville, Md., assignor to Litton Systems, Inc., College Park, Md.
Filed June 14, 1963, Ser. No. 287,884
7 Claims. (Cl. 346—74)

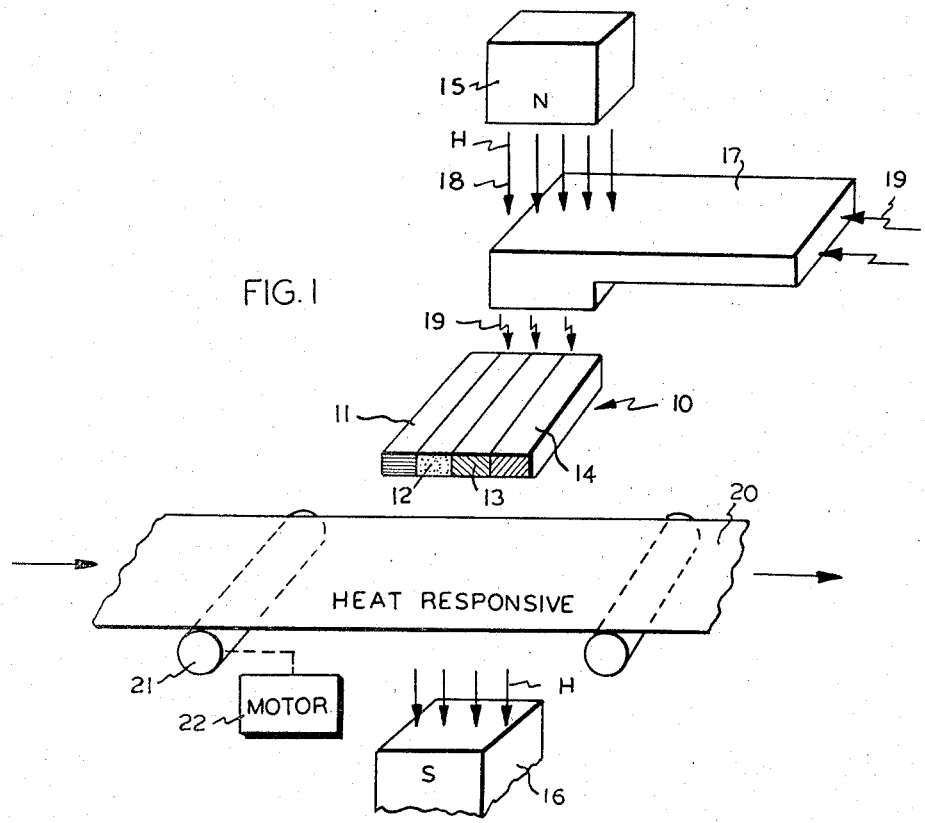
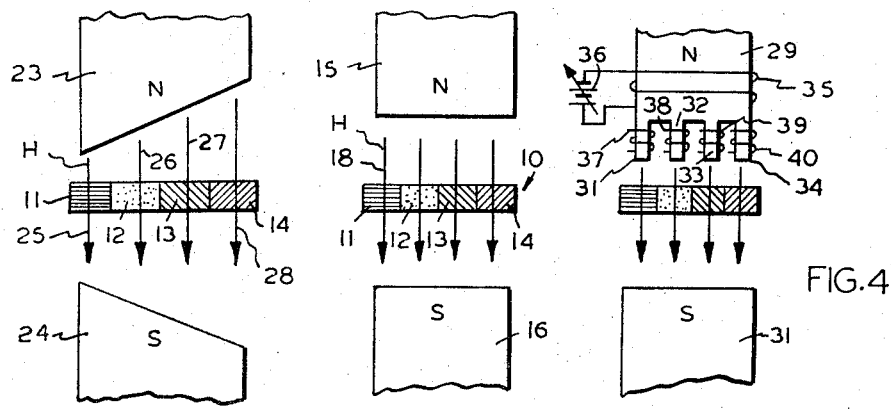
FIG.3   FIG.2   FIG.4
INVENTOR
HAROLD C. ANDERSON
BY
ATTORNEYS United States Patent Office 3,369,251
Patented Feb. 13, 1968

This invention relates generally to the transducing of high frequency time variable signals, such as microwave frequency signals, and is particularly concerned with converting time variable electromagnetic beams or magnetic fields at microwave frequencies into a form suitable for recording or display.

In an earlier application of Kenneth Peltzer, Ser. No. 102,429, filed Apr. 12, 1961, now Patent No. 3,152,321 and assigned to the same assignee, there is disclosed a high frequency signal transducer and process for the microwave range of frequencies, that functions to convert a time varying microwave signal into a series of frequency spectrum images corresponding to the frequency components of the signal.

This prior transducer medium is comprised of a frequency sensitive spin resonant mass that reproduces or transduces the microwave signal into the form of heat images, which are recorded by applying the transducer to a heat sensitive tape or other medium. For transducing a time variable signal into frequency spectrum heat images, a nonhomogenous magnetic field is applied to the transducer mass whereby the mass separates the different frequency components in the signal from one another and produces these in the form of spatial images of the spectral frequency components.

According to the present invention, there is provided a transducer and process for performing a similar function but being comprised of a composite mass of differently characterized spin resonant materials each of which normally responds to different frequency signals. These different materials are disposed in spaced relation to one another and therefore may be tuned by a uniform magnetic field to separate the frequency components of the signal, instead of by a nonhomogenous field as in the prior application. Alternatively, the transducer may be tuned by a nonhomogenous field to expand or narrow the bandwidth of the transducer and/or to provide other desired variations in the response characteristics of the transducer.

It is accordingly a principal object of the invention to provide a transducer for converting a time variable high frequency signal into spatial images or patterns containing the frequency components of the signal for such purposes as display, recording, or the like.

A further object is to provide such a transducer that produces these patterns in a form representing the frequency spectrum of the signal.

Still another object is to provide a solid state transducer that performs this function by variation in the energy states of a solid state composite mass of material.

A still further object is to provide such a transducer that may be frequency tuned to vary its bandwidth by means of an externally applied magnetic field.

Still another object is to provide such a transducer that may be externally tuned by a homogenous magnetic field and that functions to separate the frequency components of an incoming signal and convert the incoming signal into a spatial pattern of the frequency components.

Other objects and many additional advantages will be more readily understood after a detailed consideration of the following specification taken with the accompanying drawings wherein:

FIG. 1 is a perspective view of one preferred transducer embodiment according to the present invention, and illustrating the parts thereof in exploded relationship, together with a recording tape and drive mechanism, FIG. 2 is a cross sectional view schematically illustrating the preferred composite spin resonant mass together with the external magnetic field applying magnets, FIG. 3 is a cross sectional view similar to FIG. 2, and illustrating the composite spin resonant mass tuned by a nonhomogenous magnetic field, and FIG. 4 is a cross sectional view similar to FIGS. 2 and 3, and illustrating one manner of individually adjusting the external magnetic field being applied to different positions of the composite mass, and commonly adjusting the field applied to all positions of the mass.

Referring to the drawing for a consideration of a preferred embodiment of the invention, there is shown in FIG. 1, a transducer including a composite mass of spin resonant material 10 illustrated as being in the form of a rectangularly shaped block consisting of four different spin resonant materials 11, 12, 13, and 14, being disposed in side-by-side relationship, and positioned between the opposing north and south poles 14 and 16 of a permanent magnet, thereby to continuously be subjected to magnetic flux 18 from the magnet.

The composite mass 10 is adapted to be continuously or discontinuously illuminated by a microwave signal over its surface, by means such as guiding an electromagnetic beam 19 through a hollow waveguide 17 leading from some position externally of the recording zone, and having an L shaped portion disposed above the spin resonant material and directing the beam coextensively with the surface of the mass 18, as shown. Thus, in the recording zone intermediate the magnetic poles 15 and 16, the composite mass of spin resonant material 10 is simultaneously subjected to a static magnetic field 18 and is uniformly illuminated over its surface by means of a radiant microwave beam being directed through the waveguide 17.

According to the present invention, the mass 10 is comprised of spin resonant materials, which are defined as various types of paramagnetic materials that are absorptive of radio frequency energy directly from a varying magnetic field or an electromagnetic field, and functioning to reproduce the absorbed energy at a different wavelength, such as in the form of heat. These materials are frequency sensitive and are tuned or rendered selectively resonant to different microwave frequencies by the application of an externally produced static magnetic field.

In the transducer of FIG. 1, each of the different rows of materials 11 to 14, inclusive, comprising the composite mass is of a different spin resonant material than that of the other rows, whereby when the mass 10 is tuned by a uniform magnetic field 18, each of the different rows of material 11 to 14 is tuned by this uniform field to selectively resonate at a different frequency.

Consequently, when the composite mass 10 is illuminated by a varying magnetic signal or microwave beam 19 containing the different frequency components to which the rows 11 to 14, inclusive, have been frequency tuned, each of the rows 11 to 14 then selectively responds only to a different one of the frequency components of the beam 19 to record only that frequency component.

Since by the well known Fouriers Analysis, a time variable magnetic field or electromagnetic beam is comprised of a series of different frequency components, the transducing mass 10 functions to separate each of these different frequency components from the others with each different frequency component being absorbed by a different row of the composite mass to provide a frequency spectrum image of the signal 19.

Upon any one or all of the rows 11 to 14, absorbing energy from the beam 19, the spin resonant material in that row functions in the manner of a resonant circuit, and the energy being absorbed is reradiated from the row at a different wavelength, such as in the form of heat. This interaction between the microwave beam 19, the static magnetic field 18, and the spin resonant material to produce heat is known in the art, and variously described in the literature and in a prior application of the same assignees, Ser. No. 73,696, filed Dec. 5, 1960, now Patent No. 3,137,003.

Thus, by means of the interaction between the magnetic field 18, the microwave signal 19, and the composite mass 10, a time varying microwave signal 19 is transduced or converted into a heat pattern in the composite mass 10, with heat being selectively developed in each of the rows of material 11 to 14 of the mass 10, corresponding to whether or not that particular frequency to which it has been tuned is contained in a microwave signal 19.

According to the invention, the intensity of the incoming microwave signal 19, the mass and other parameters involved are selected such that the resonant condition of any one of the rows of composite mass 10 is not destroyed by the absorption of energy for the microwave beam. Consequently, the heat patterns are continually produced and decay in the transducer corresponding to the time variations in the microwave signal being applied to the mass. In this manner, the continuous or discontinuous illumination of the same composite mass 10 by the microwave signal produces a sequence of different heat patterns or images in the composite mass 10 corresponding to the variations in the microwave signal 19.

For recording these heat patterns or images, a heat sensitive elongated tape or record member 20 is passed through the recording zone intermediate the magnetic poles 15 and 16. On the upper side of this tape 20, there is provided a layer of heat sensitive material, as indicated, and in passing through the recording zone, this heat sensitive tape is maintained in contact with, or otherwise in heat transferring relationship to the composite mass 10 of spin resonant material. Consequently, the heat images being produced in the mass 10 are each transferred to different positions along the moving tape 20, thereby to record the images or heat patterns on the tape. As is believed evident, the heat patterns or images may alternatively be recorded by providing an elongated and stationary heat sensitive tape 20 and moving the mass and transducer mechanism into heat transferring relationship with different positions alongside a stationary tape 20.

Among the many known materials falling within the class of spin resonant materials according to the present invention, the class of free radical materials have been found particularly suitable for use in the composite mass 10, in that such materials possess very sharp resonant frequencies. The frequency of resonance of such materials is calculated by the formula $$V = \frac{gBH}{h}$$

where

V is the frequency at which the material is resonant,
H is the value of the externally applied tuning magnetic field, stated in terms of gauss, and which may be varied to change the resonant frequency,
g is the spectroscopic splitting factor for the spin resonant material selected, often called the g— value,
B is a constant for all materials and is termed the Bohr magneton equal to $0.92731 \times 10^{-20}$ erg gauss $^{-1}$, and
h is also a constant for all materials and is known as Planck's constant, equal to $6.62517 \times 10^{-27}$ erg seconds.

It is noted that in this formula that only the g— value is a variable quantity related to the characterisitc peculiar to the spin resonant material employed, since both factors B and h are constants for all materials and the parameter H is the amplitude or intensity of the externally applied tuning magnetic field 18. As a general rule, many different spin resonant materials possess the same or substantially the same g— value. For example, in the class of free radical materials referred to above, most of the free radicals have g— values that lie within the narrow range of ½% of the g— number 2.0023. However, there are exceptions to this general rule and some of the known free radical materials deviate from this narrow range, such as the free radical material ultramarine which possesses a higher g— value of 2.0286.

For an example of the application of the above, let it be assumed that the first row 11 of the composite mass 10 is comprised of a first free radical material which possesses a g— value of 2.0030; the row 12 is comprised of a different material having a g— value of 2.0036; the row 13 is comprised of a third material having a g— value of 2.0042; and finally the row 14 is of a fourth material having a g— value of 2.0286. If this composite mass is then placed in a homogenous or uniform static magnetic field, as in FIG. 1 and FIG. 2, having an intensity of 3000 gauss, the first row 11 is selectively tuned to resonate at a frequency of about 8.411 megacycles; the row 12 is tuned to resonate at about 8.413 megacycles; row 13 is tuned to resonate at about 8.415 megacycles, and row 14 to resonate at about 8.522 megacycles. Consequently, when the composite mass 10 including all four rows is directly illuminated by a microwave signal 19 having one or more of these frequency components, each of the different frequency components in the signal corresponding to these different resonant frequencies is then imaged or recorded only at that one of the rows 11 to 14, inclusive, to produce heat at that row.

The g— values of different spin resonant materials are known, and are extensively set forth in the published literature. For further information as to free radical materials, one textbook reference where such information will be found is "Free Radicals as Studied by Electron Spin Resonance," by D. J. E. Ingram, published by the Philosophical Library, New York, New York.

Among the numerous paramagnetic materials, these g— values will be found to vary over a range of 1 to 6 or more.

Typical spin resonant materials having different g— values that may be employed in practicing the invention are set forth below. This list should not be considered as being comprehensive of all such materials that may be employed according to the invention but merely a limited number of those found suitable in practicing the invention.

| | g— values |
|---|---|
| Diphenylpicyralhydrazyl | 2.0036 |
| Beta-(phenyl-nitrogen oxide)beta methyl pentane N-phenyl ether | 2.0257 |
| Di-p-anisyl nitric oxide | 2.0063 |
| Ultramarine | 2.0286 |

With respect to the heat sensitive tape 12, a vast number of such heat sensitive materials are also well known and presently available commercially under the general name of thermographic copy papers or tapes. One preparation producing a black color change of fairly good quality when exposed to elevated temperatures is comprised at 30% of urea; 10% of nick acetate; 3% of thiourea, and 57% of water. This composition is applied in liquid form onto a suitable base stock of paper or the like by means of a dip squeezing or flow coating process, and is dried to produce the usable heat sensitive tape or record. A large number of other heat sensitive materials are also commercially available that produce change of color with heat or otherwise vary their chemical or physical properties in a detectable manner when heated, and accordingly this invention is not to be considered as being limited to any specific heat sensitive material.

In many of these heat sensitive materials, the critical elevated temperature or temperature range required to effect the change in color in the tape may be greater than that that can be obtained from the heat pattern produced by the resonant mass 10 of composite material. In such instances, the tape 20 may be preheated in the recording zone, by means of a separate heating coil or the like (not shown), to just under this critical temperature or range. Upon the added application to the tape 20 of the heat pattern being produced in the resonant mass 10, the temperature of the tape at the discrete locations forming the desired image is, therefore, sufficiently raised to exceed its critical temperature and thereby effect the recording of the heat image.

In the embodiment of FIGS. 1 and 2, the composite mass 10 is subjected to a uniform magnetic field 18, and the component frequencies of the microwave signal 19 are separated as a result of the different $g-$ values of the different materials 11 to 14, inclusive, making up the composite mass. For increasing the recording bandwidth or frequency spread between the rows 11 to 14, the composite mass 10 may alternatively be subjected to a nonhomogenous magnetic field as shown in FIG. 3, where the mass 10 is placed between progressively divergent magnetic poles 23 and 24. In this case, the row of material 14 being located between the more separated pole regions receives a much less intense magnetic field 28 than does the row of material 11 located between the more closely spaced region of the magnetic poles. If the $g-$ value of the material 11 is also greater than that of the material 14, the respective frequencies at which the two materials 11 and 14 resonate will be more widely separated according to the respective products of $g$ and H. Similarly, the resonant frequencies of the other rows of material 12 and 13 will also be more widely separated from each other and from that of materials 11 and 14 for the same reason; namely, that the $g$ H products will be more widely separated. Thus, in addition to providing different spin resonant materials 11 to 14, at different locations in the composite mass 10, the static magnetic field 18 being applied to these different materials may be also varied, whereby each one of the different materials may be tuned to resonate at any desired frequency with respect to the others thereby to increase or decrease the bandwidth of recording.

FIG. 4 illustrates one manner of changing the magnetic field being applied to the rows of materials 11 to 14, inclusive, in a nonuniform predetermined manner for such diverse purposes as recording of frequency codes or other forms of intelligence. As shown, each of the rows 11 to 14, inclusive, is disposed under a different discrete pole 31 to 34, inclusive, projecting from a magnet 29, with each of these separate poles being provided with a separate energizing coil 37 to 40, inclusive, and thereby adapted to be individually energized to selectively vary the magnetic flux produced at that position. In this manner, the magnetic field being applied to each of the rows 11 to 14, inclusive, may be preselected to individually tune that row of material to a particular frequency desired.

FIG. 4 also illustrates one manner of uniformly changing the magnetic field for shifting the bandwidth of recording, while maintaining the frequency separation between the resonant rows 11 to 14 substantially constant.

As illustrated, this may be performed by providing a single winding 35 about the parent magnetic pole 29 and variably adjusting the energization to this winding by such means as a variable voltage or current source 36, as shown. In this case, a change in the current passing through winding 35 uniformly increases or decreases the flux produced by all of the projecting poles 31 to 34, inclusive, so as to shift the complete frequency band, without disturbing the relationship between the magnetic field existing between individual ones of the bars 11 to 14. This result may also be obtained by simultaneously energizing all of the individual windings 37 to 40, inclusive, to uniformly increase or decrease the magnetic flux being applied to indivdual rows of the composite mass.

Although in the illustrated embodiments, the composite mass 10 is disclosed as being a member having a number of parallel arranged rows of material of different $g-$ value, it is believed evident that the different spin resonant materials may be otherwise supported on or combined in the mass in any desired configuration, pattern, or shape, either continuous or discontinuous in nature, as might be desired. It is further evident that the mass may be tuned into resonance with the microwave signal by differently configured homogenous or nonhomogenous magnetic fields, being produced by either permanent magnets or electromagnetic field generators in any desired intensity and spatial configuration compatibly with the recording processes desired. Furthermore, various means other than the waveguides 17 may be employed for directing the microwave signal to illuminate the spin resonant composite mass 10, including parallel line or coaxial transmission means, dipoles, or other beam shaping antenna means and others. It is furthermore believed evident to those skilled in the art that the microwave signal being applied to the composite mass 10 may be a varying magnetic field about a conductor as well as a radiant electromagnetic field, and the signal may be accordingly recorded from either a radiant or nonradiant magnetic or electromagnetic field at the frequency to which the composite mass has been tuned. Since these and many other changes may be made by those skilled in the art without departing from the spirit and scope of this invention, this invention is to be considered as being limited only by the following claims appended hereto.

What is claimed is:

1. A frequency discriminative transducer for radio frequency signals comprising: a composite member including a plurality of differently characterized spin resonant materials being disposed at different portions of the member, said differently characterized spin resonant materials being selectively responsive to different radio frequencies when exposed to a common magnetic field, means for applying a radio frequency signal to be recorded to said plurality of differently characterized materials in common, thereby to selectively vary the condition of said materials responsively to the different component frequencies in the signal to provide a spectral image of the frequencies in the member, and means for transferring the image to provide a recording thereof.

2. A transducer for recording a radio frequency signal comprising: a composite mass of differently characterized spin resonant materials occupying a spatial region, with the spin resonant materials at different spatial positions in the composite mass being selectively responsive to different radio frequencies when subjected to a homogenous magnetic field, means producing a magnetic field to sensitize said different positions into energy absorptive relationship with different component frequencies of the signal, means for directing a time variable magnetic field to said different spatial positions in common to provide a temporary spectral image of the component frequencies of the field, and means for enabling the transfer of the temporary image to provide a permanent recording thereof.

3. In the transducer of claim 2, said magnetic field producing means providing a homogenous magnetic field at said different positions of the mass.

4. In the transducer of claim 2, said magnetic field producing means providing a nonhomogenous magnetic field at said different positions of the mass.

5. In a recording apparatus, a transducer for microwave frequency signals comprising: a mass of spin resonant material occupying a dispersed spatial region, means for conveying a microwave signal to energize said mass, said mass having differently characterized spin resonant materials being disposed at different spatial positions of the mass, whereby said different spatial positions are tunable by a homogenous magnetic field to selectively respond to different component frequencies of the signal, means for sensitizing said mass by a magnetic field to tune said different positions of the mass to respond to different frequency components of the microwave signal to provide a spectral image, and means for enabling the transfer of the image.

6. A transducer for signals at microwave frequencies comprising: a material having a plurality of dispersed spatial positions with each position being frequency sensitive to a magnetic signal at a different microwave frequency when tuned by a uniform magnetic field, means for applying a static magnetic field to all of said different positions to tune each position to respond to a different frequency, means for applying a time variable magnetic field to all of said positions in common, thereby to provide a spectral frequency image of said signal with the different frequency components of the signal being spatially dispersed at said different positions, and means for adjustably varying the static magnetic field being applied to each position individually and adjustably varying the magnetic field in common to all positions.

7. A transducer for converting time variable signals at microwave frequencies into heat patterns comprising: a member having a plurality of spin resonant regions disposed at different spatial positions on the member, each of said spin resonant regions being frequency sensitive to signals at different microwave frequencies when tuned by a static magnetic field of uniform intensity, said spin resonant regions characterized as being absorptive of said frequencies to reradiate the energy absorbed in the form of heat, means for tuning said regions by a static magnetic field, means for applying the microwave signal to said regions in common to produce a heat pattern corresponding to the spectral distribution of frequencies in the microwave signal, and means for applying said member in heat transferring relationship to a heat sensitive member to transfer the heat pattern thereto.

References Cited

UNITED STATES PATENTS

| | | | |
|---|---|---|---|
| 3,052,567 | 9/1962 | Gabor et al. | 117—235 |
| 3,119,099 | 1/1964 | Biernat | 340—173 |
| 3,152,321 | 10/1964 | Peltzer | 340—173 |

BERNARD KONICK, *Primary Examiner.*

J. BREIMAYER, *Assistant Examiner.*